United States Patent

Nakada et al.

[11] Patent Number: 5,917,799
[45] Date of Patent: Jun. 29, 1999

[54] METHOD OF READING DATA OF MAGNETO-OPTICAL RECORDING MEDIUM WHICH INCLUDES A GUIDE GROOVE PORTION HAVING LAND AND GROOVE AREAS

[75] Inventors: Masafumi Nakada; Masatsugu Ogawa, both of Tokyo, Japan

[73] Assignee: NEC Corporation, Japan

[21] Appl. No.: 09/082,372

[22] Filed: May 20, 1998

Related U.S. Application Data

[62] Division of application No. 08/671,602, Jun. 28, 1996.

[30] Foreign Application Priority Data

Jun. 29, 1995 [JP] Japan .................................. 7-184964

[51] Int. Cl.$^6$ ......................................................... G11B 7/00
[52] U.S. Cl. ............................................ 369/110; 369/277
[58] Field of Search .................................... 369/110, 112, 369/109, 100, 275.1, 275.4, 277, 47, 48, 54, 58, 59, 13

[56] References Cited

U.S. PATENT DOCUMENTS

| | | | |
|---|---|---|---|
| 5,084,860 | 1/1992 | Maeda et al. | 369/277 X |
| 5,144,552 | 9/1992 | Abe | 369/277 X |
| 5,191,564 | 3/1993 | Hosokawa | 369/277 X |

*Primary Examiner*—Muhammad N. Edun
*Attorney, Agent, or Firm*—Hayes, Soloway, Hennessey, Grossman & Hage, P.C.

[57] ABSTRACT

In a magneto-optical recording medium which includes a guide groove portion having a land area, a groove area, and a boundary area between the land area and the groove area, both of the land area and the groove area may have a V-shaped cross-section. At least one of the land area and the groove area may have a protruding portion which is formed in parallel to the guide groove portion and which has a width which is less than a half of a wavelength of a read laser beam.

3 Claims, 8 Drawing Sheets

METHOD OF READING DATA OF MAGNETO-OPTICAL RECORDING MEDIUM WHICH INCLUDES A GUIDE GROOVE PORTION HAVING LAND AND GROOVE AREAS

This is a divisional of copending application Ser. No. 08/671,602 filed on Jun. 28, 1996.

BACKGROUND OF THE INVENTION

1. Field of the Invention

The invention relates to a magneto-optical recording medium and a method of reading data from the magneto-optical recording medium, and more particularly, to a magneto-optical recording medium and method of reading data from the magneto-optical recording medium which comprises a guide groove portion having land and groove areas.

2. Brief Description of Related Prior Art

A first conventional magneto-optical recording medium comprises a guide groove portion having land and groove areas.

A first conventional magneto-optical recording and reading method records data in only the land area.

A second conventional magneto-optical recording and reading method is disclosed in Volume 1316 (1990) of the Society of Photo Optical Instrumentation Engineers, Page 35 (Proc. SPIE 1316 (1990) 35). The second conventional magneto-optical recording and reading method records data in both the land and groove areas. The second conventional magneto-optical recording and reading method uses a second conventional magneto-optical recording medium.

The conventional magneto-optical recording medium comprises a plastic substrate, a silicon nitride rough layer, a recording layer of TbFeCo, a silicon nitride interference layer, and a reflection layer of Al.

The plastic substrate has a track pitch Pt of 1.2 $\mu$m. The silicon nitride rough layer overlies the plastic substrate and has a thickness of 59 nm. The recording layer overlies the silicon nitride rough layer and has a thickness of 20 nm. The silicon nitride interference layer overlies the recording layer and has a thickness of 114 nm. The reflection layer overlies the silicon nitride interference layer and has a thickness of 40 nm.

The magneto-optical recording medium comprises a guide groove portion having a land area, a groove area, and a boundary area between the land area and the groove area. A level difference between the land area and the groove area is about 80 nm. The boundary area has an inclination angle of about 20 degrees.

When a write laser beam is projected onto a part of the magneto-optical recording medium when the part is objected to a magnetic field having a magnetic field direction for magnetization, a datum is recorded or written in the part of the magneto-optical recording medium. When a read laser beam is projected onto the part of the magneto-optical recording medium, the datum in the part is read by detecting a plane of vibration of a reflected beam of the read laser beam.

In the method of reading data from the magneto-optical recording medium, a polarization direction of a linearly polarized beam of the read laser beam forms an angle with the guide groove portion. The angle is 90 degrees or 180 degrees.

By a method of writing to and reading data from the magneto-optical recording medium, the data are written with a linear velocity of 9.4 m/s in both the land area and groove area of the magneto-optical recording medium, and the data are read from both the land area and groove area of the magneto-optical recording medium. In this case, the method uses a laser beam which has a wavelength of 680 nm. As a result, characteristic curves are obtained. The characteristic curves represent relationship of carrier/noise (C/N) to frequency of the laser beam.

However, in this method, output of reading the data of the land area 18 is not equal to output of reading the data of the groove area. Also, when the polarization direction of the linearly polarized beam of the read laser beam forms the angle with the guide groove portion that is 90 degrees or 180 degrees, the value of the C/N of the land area is not equal to the value of the C/N of the groove area.

Thus, the outputs of reading the data of the land area and the groove area are different, and the values of C/N of the land area and the groove area are different. Therefore, in this conventional magneto-optical recording medium and method of reading the data from the magneto-optical recording medium, it is impossible to reliably read the data of the magneto-optical recording medium.

SUMMARY OF THE INVENTION

Accordingly, it is an object of the invention to provide a magneto-optical recording medium and a method of reading data from magneto-optical recording medium which are capable of reliably reading data from the magneto-optical recording medium.

It is another object of the invention to provide a magneto-optical recording medium and a method of reading data from the magneto-optical recording medium which are capable of decreasing difference in outputs from reading data of land and groove areas of a guide groove portion.

It is a further object of the invention to provide a magneto-optical recording medium and a method of reading data from the magneto-optical recording medium which are capable of decreasing difference in values of C/N of land and groove areas of a guide groove portion.

It is a yet further object of the invention to provide a magneto-optical recording medium and a method of reading the data of the magneto-optical recording medium which are capable of increasing outputs of reading data of land and groove areas of a guide groove portion.

Other objects of the invention will become clear as the following Detailed Description proceeds.

According to a first aspect of the invention, there is provided a magneto-optical recording medium which comprises a guide groove portion having a land area, a groove area, and a boundary area between the land area and the groove area, wherein:

the boundary area has an inclination angle $\Phi$ which is greater than 70 degrees and equal to or less than 90 degrees.

According to a second aspect of the invention, there is provided a magneto-optical recording medium which comprises a guide groove portion having a land area, a groove area, and a boundary area between the land area and the groove area, wherein:

at least one of the land area and the groove area has a V-shaped cross-section.

According to a third aspect of the invention, there is provided a magneto-optical recording medium which comprises a guide groove portion having a land area, a groove area, and a boundary area between the land area and the groove area, wherein:

at least one of the land area and the groove area has a protruding portion which is formed in parallel to the guide groove portion and which has a width which is less than a half of a wavelength of a read laser beam.

According to a fourth aspect of the invention, there is provided a method of reading, by using a read laser beam, data of a magneto-optical recording medium which comprises a guide groove portion having a land area, a groove area, and a boundary area between the land area and the groove area, wherein:

a polarization direction of a linearly polarized beam of the read laser beam forms an angle α with the guide groove portion, the angle α being from 40 degrees to 50 degrees both inclusive.

According to a fifth aspect of the invention, there is provided a method of reading, by using a read laser beam, data of a magneto-optical recording medium which comprises a guide groove portion having a land area, a groove area, and a boundary area between the land area and the groove area, at least one of the land area and the groove area having a V-shaped cross-section, wherein:

a polarization direction of a linearly polarized beam of the read laser beam forms an angle of 90 degrees with the guide groove portion.

According to a sixth aspect of the invention, there is provided a method of reading, by using a read laser beam, data of a magneto-optical recording medium which comprises a guide groove portion having a land area, a groove area, and a boundary area between the land area and the groove area, at least one of the land area and the groove area having a protruding portion which is formed in parallel to the guide groove portion and which has a width which is less than a half of a wavelength of the read laser beam, wherein:

a polarization direction of a linearly polarized beam of the read laser beam forms an angle of 90 degrees with the guide groove portion.

BRIEF DESCRIPTION OF THE DRAWINGS

The invention will be explained in more detail in conjunction with appended drawings, wherein.

DETAILED DESCRIPTION OF THE PREFERRED EMBODIMENTS

Before explaining a magneto-optical recording medium and method of reading data of the magneto-optical recording medium in the preferred embodiments according to the invention, the aforementioned conventional magneto-optical recording medium and method of reading data from the magneto-optical recording medium will be explained in FIGS. 1 and 2.

Figure 1:
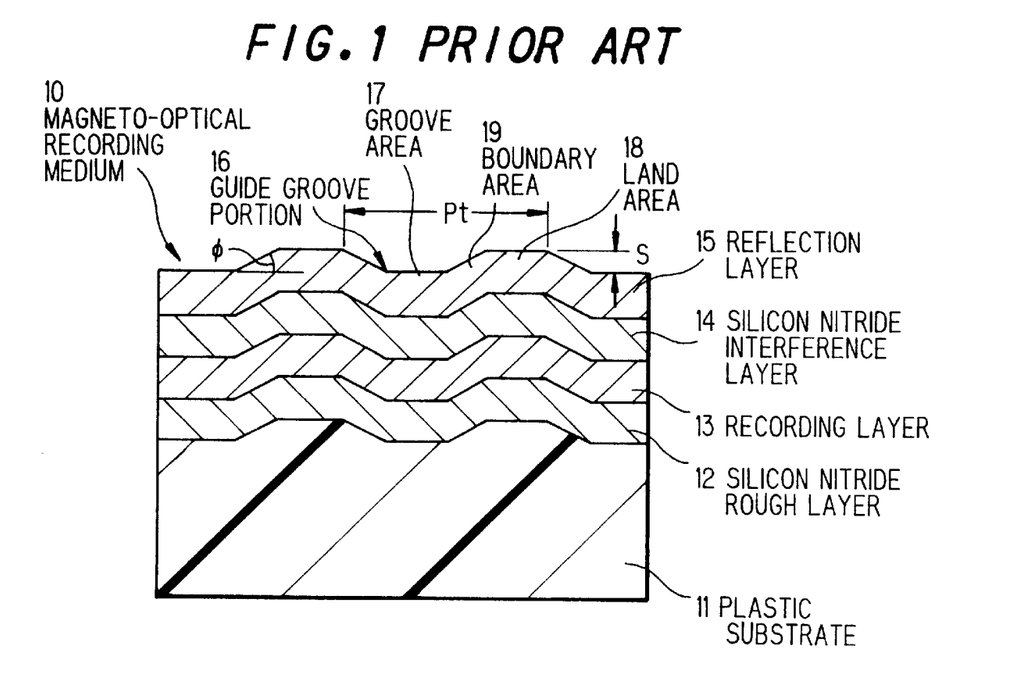
FIG. 1 is a schematic sectional view of a conventional magneto-optical recording medium.

In FIG. 1, the conventional magneto-optical recording medium 10 comprises a plastic substrate 11, a silicon nitride rough layer 12, a recording layer 13 of TbFeCo, a silicon nitride interference layer 14, and a reflection layer 15 of Al. The plastic substrate 11 has a track pitch Pt of 1.2 μm. The silicon nitride rough layer 12 overlies the plastic substrate 11 and has a thickness of 59 nm. The recording layer 13 overlies the silicon nitride rough layer 12 and has a thickness of 20 nm. The silicon nitride interference layer 14 overlies the recording layer 13 and has a thickness of 114 nm. The reflection layer 15 overlies the silicon nitride interference layer 14 and has a thickness of 40 nm.

The magneto-optical recording medium 10 comprises a guide groove portion 16 having a groove area 17, a land area 18, and a boundary area 19 between the groove area 17 and the land area 18. A level difference S between the groove area 17 and the land area 18 is about 80 nm. The boundary area 19 has an inclination angle Φ of about 20 degrees.

When a write laser beam is projected onto a part of the magneto-optical recording medium 10 when the part is subjected to a magnetic field having a magnetic field direction for magnetization, a datum is recorded or written in the part of the magneto-optical recording medium 10. When a read laser beam is projected onto the part of the magneto-optical recording medium 10, the datum in the part is read by detecting a plane of vibration of a reflected beam of the read laser beam.

In the method of reading data from the magneto-optical recording medium 10, polarization direction of a linearly polarized beam of the read laser beam forms an angle α with the guide groove portion. The angle α is 90 degrees or 180 degrees.

By a method of writing and reading data of the magneto-optical recording medium 10, data are written with a linear velocity of 9.4 m/s in both the groove area 17 and land area 18 of the magneto-optical recording medium 10 and the data are read from both the groove area 17 and land area 18 of the magneto-optical recording medium 10. In this event, the method uses the laser beam which has a wavelength of 680 nm. As a result, as shown in FIG. 2, characteristic curves 21, 22, 23, and 24 are obtained.

The characteristic curves 21 to 24 represent relationships of carrier/noise (C/N) to frequency of the laser beam. The characteristic curves 21 represent the relationship of C/N to frequency in the land area 18 when the polarization direction of the linearly polarized beam of the read laser beam forms the angle α with the guide groove portion 16 that is 90 degrees. When the polarization direction of the linearly polarized beam of the read laser beam forms an angle of 90 degrees with the guide groove portion 16, the linearly polarized beam will hereafter be called a p polarized beam. The characteristic curves 22 represent the relationship of C/N to the frequency in the groove area 17 when the polarization direction of the linearly polarized beam of the read laser beam forms the angle α with the guide groove portion 16 that is 90 degrees. The characteristic curves 23 represents the characteristic of the C/N to frequency in the groove area 17 when the polarization direction of the linearly polarized beam of the read laser beam forms the angle α with the guide groove portion 16 that is 180 degrees, namely, when the polarization direction of the linearly polarized beam of the read laser beam is parallel to the guide groove portion 16. When the polarization direction of the linearly polarized beam of the read laser beam is parallel to the guide groove portion 16, the linearly polarized beam will hereafter be called an s polarized beam. The characteristic curves 24 represent the relationship of C/N to frequency in the land area 18 when the polarization direction of the linearly polarized beam of the read laser beam forms the angle $\alpha$ with the guide groove portion 16 that is 180 degrees.

Figure 2:
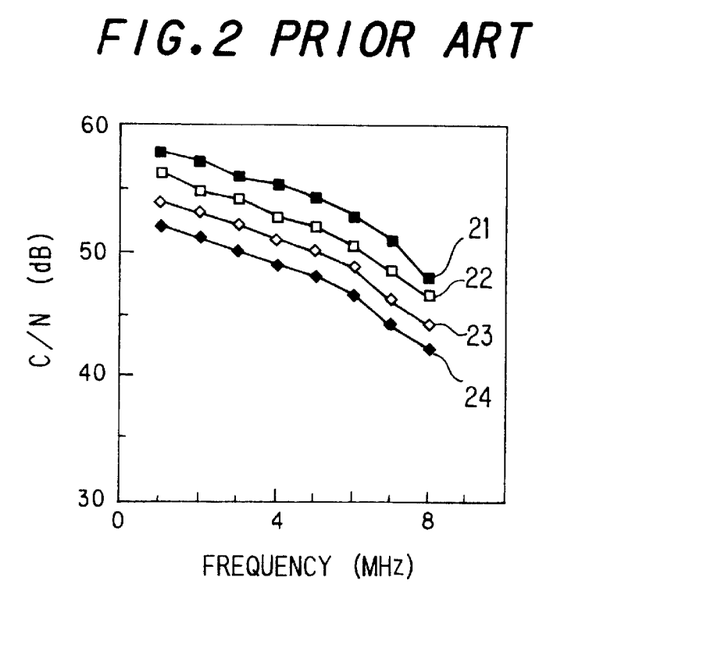
FIG. 2 is a graph for explaining a conventional method.

As shown in FIG. 2, when the polarization direction of the linearly polarized beam of the read laser beam forms the angle $\alpha$ with the guide groove portion 16 that is 90 degrees, the C/N of the land area 18 is greater than that of the groove area 17 by about 3 dB.

When the polarization direction of the linearly polarized beam of the read laser beam forms the angle $\alpha$ with the guide groove portion 16 that is 180 degrees, the C/N of the land area 18 is smaller than that of the groove area 17 by about 3 dB.

However, in the method, output of reading the data of the land area 18 is not equal to an output of reading the data of the groove area 17. Also, as shown in FIG. 2, when the polarization direction of the linearly polarized beam of the read laser beam forms the angle $\alpha$ with the guide groove portion 16 that is 90 degrees or 180 degrees, value of the C/N of the land area 18 is not equal to value of the C/N of the groove area 17. Thus, the outputs of reading the data of the land area 18 and the groove area 17 are different and the values of the C/N of the land area 18 and the groove area 17 are different. Therefore, in the magneto-optical recording medium 10 and the method of reading the data of the magneto-optical recording medium 10, it is impossible to reliably read the data from the magneto-optical recording medium 10.

Referring to FIGS. 3, 4, 5, and 6, the Detailed Description will proceed to a first embodiment of the invention. Similar parts are designated by like reference numerals.

Figure 3:
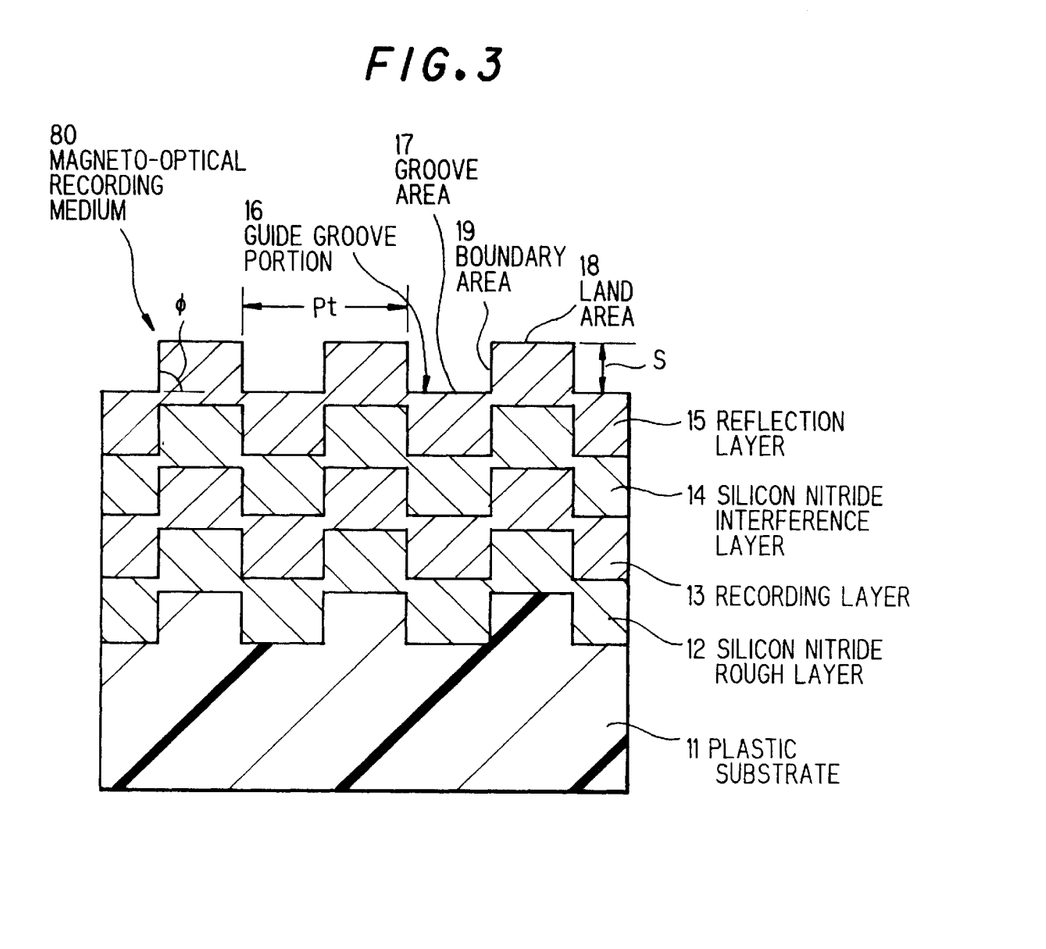
FIG. 3 is a schematic sectional view of a magneto-optical recording medium according to a first embodiment of the invention.

In FIG. 3, the magneto-optical recording medium 30 comprises a plastic substrate 11, a silicon nitride rough layer 12, a recording layer 13 of TbFeCo, a silicon nitride interference layer 14, and a reflection layer 15 of Al.

The plastic substrate 11 has a track pitch Pt of 1.2 $\mu$m. The silicon nitride rough layer 12 overlies the plastic substrate 11 and has a thickness of 59 nm. The recording layer 13 overlies the silicon nitride rough layer 12 and has a thickness of 20 nm. The silicon nitride interference layer 14 overlies the recording layer 13 and has a thickness of 114 nm. The reflection layer 15 overlies the silicon nitride interference layer 14 and has a thickness of 40 nm.

The magneto-optical recording medium 30 comprises a guide groove portion 16 having a groove area 17, a land area 18, and a boundary area 19 between the groove area 17 and the land area 18. A level difference S between the groove area 17 and the land area 18 is about 80 nm. The boundary area 19 has an inclination angle $\Phi$ of about 90 degrees. Width of the groove area 17 is substantially equal to width of the land area 18. The silicon nitride rough layer 12 and the silicon nitride interference layer 14 are formed by rf-sputtering which uses a silicon target. In this case, pressure of sputtering gas is 0.2 Pa, throughput of argon gas is 50 sccm, and electric power supplied is 800 W. The recording layer 13 is formed by magnetron sputtering which uses a composite target. In this case, pressure of sputtering gas is 0.08 Pa, throughput of argon gas is 50 sccm, and electric power supplied is 100 W.

Figure 4:
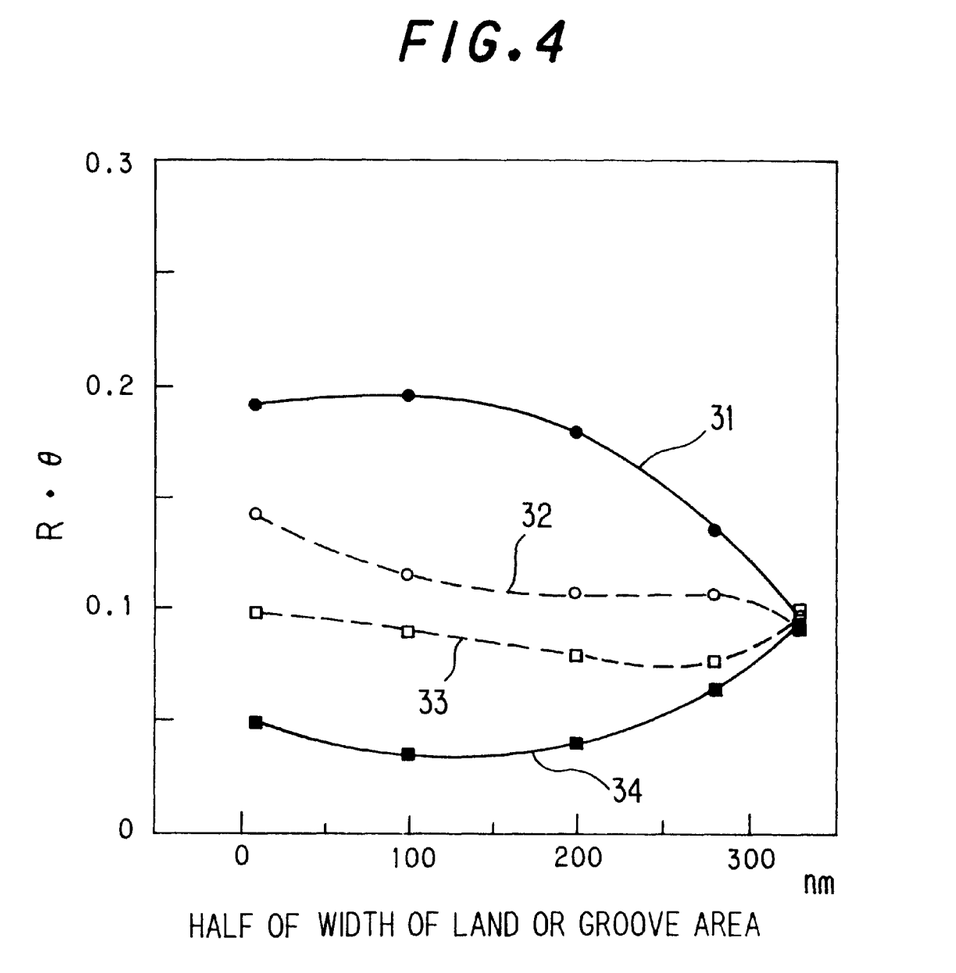
FIG. 4 is a graph for explaining a principle of the invention.

The outputs of reading the data of the land area 18 and the groove area 17 are substantially determined by a product (R$\theta$) of R and $\geq$, where R represents reflectance and $\theta$ represents Kerr rotation angle. FIG. 4 shows a relationship of the product (R$\theta$) and form of the guide groove portion 16, where width of the guide groove portion 16 is 680 nm (namely, the track pitch Pt is 1.36 $\mu$m.), quadrature axis represents a half of a width of a flat area in the groove area 17 or the land area 18, wavelength of an incident beam is 680 nm, diameter of the laser beam is 1360 nm, and level difference S between the groove area 17 and the land area 18 is 80 nm. In FIG. 1, characteristic curves 31, 32, 33, and 34 are obtained by boundary element method calculation. Therefore, when the half of the width of the flat area in the groove area 17 or the land area 18 is 0 nm, a cross-section form of the guide groove portion 16 is a form of V. When half of the width of the flat area in the groove area 17 or the land area 18 is 340 nm, the cross-sectional form of the guide groove portion 16 is a rectangle.

The characteristic curves 31 represent the relationship in the land area 18 when the polarization direction of the linearly polarized beam of the read laser beam forms the angle $\alpha$ with the guide groove portion 16 that is 90 degrees. The characteristic curves 32 represent the relationship in the groove area 17 when the polarization direction of the linearly polarized beam of the read laser beam forms the angle $\alpha$ with the guide groove portion 16 that is 90 degrees. The characteristic curves 33 represent the relationship in the groove area 17 when the polarization direction of the linearly polarized beam of the read laser beam forms the angle $\alpha$ with the guide groove portion 16 that is 180 degrees. The characteristic curves 34 represent the relationship in the land area 18 when the polarization direction of the linearly polarized beam of the read laser beam forms the angle $\alpha$ with the guide groove portion 16 that is 180 degrees.

As shown in FIG. 4, when half of the width of the flat area in the groove area 17 or the land area 18 is 340 nm, namely, when the cross-sectional form of the guide groove portion 16 is the rectangle (namely, the boundary area 19 has an inclination angle $\Phi$ which is 90 degrees.), the product (R$\theta$) in the land area 18 is substantially equal to the product (R$\theta$) in the groove area 17 regardless of the polarization direction of the linearly polarized beam of the read laser beam. Similarly, when the boundary area 19 has an inclination angle $\Phi$ which is from 70 degrees to 90 degrees, the product (R$\theta$) in the land area 18 is substantially equal to the product (R$\theta$) in the groove area 17 regardless of the polarization direction of the linearly polarized beam of the read laser beam. Inasmuch as the outputs of reading the data of the land area 18 and the groove area 17 are proportioned to the product (R$\theta$), the output of reading the data of the land area 18 is substantially equal to the output of reading the data of the groove area 17.

Also, the product (R$\theta$) changes in response to the polarization direction of the linearly polarized beam of the read laser beam. As shown in FIG. 4, when the p polarized beam is projected onto the groove area 17 the land area 18, the product (R$\theta$) in the land area 18 is greater than that in the groove area 17. When the s polarized beam is projected onto the groove area 17 the land area 18, the product (R$\theta$) in the land area 18 is smaller than that in the groove area 17. In addition, a sum of the product (R$\theta$) by the p polarized beam and the product (R$\theta$) by the s polarized beam in the land area 18 is substantially equal to a sum of the product (R$\theta$) by the p polarized beam and the product (R$\theta$) by the s polarized beam in the groove area 17. To use the s polarized beam and the p polarized beam at the same time is substantially equal to use of a linearly polarized beam of which the polarization direction forms the angle $\alpha$ with the guide groove portion 16 that is 45 degrees. Therefore, when the polarization direction of the linearly polarized beam of the read laser beam forms the angle α with the guide groove portion 16 that is from 40 degrees to 50 degrees both inclusive, the product (Rθ) in the land area 18 is substantially equal to the product (Rθ) in the groove area 17 regardless of the form of the guide groove portion 16.

Next, the product (Rθ) by the p polarized beam in the land and groove areas 18 and 17 is greater than the product (Rθ) by the s polarized beam in the land and groove areas 18 and 17. In addition, when the form of the guide groove portion 16 changes from the rectangle to the form of a V, the product (Rθ) becomes greater. Therefore, when the form of the guide groove portion 16 is in the form of a V and when the p polarized beam is projected to the guide groove portion 16, the product (Rθ) becomes greater.

Figure 5:
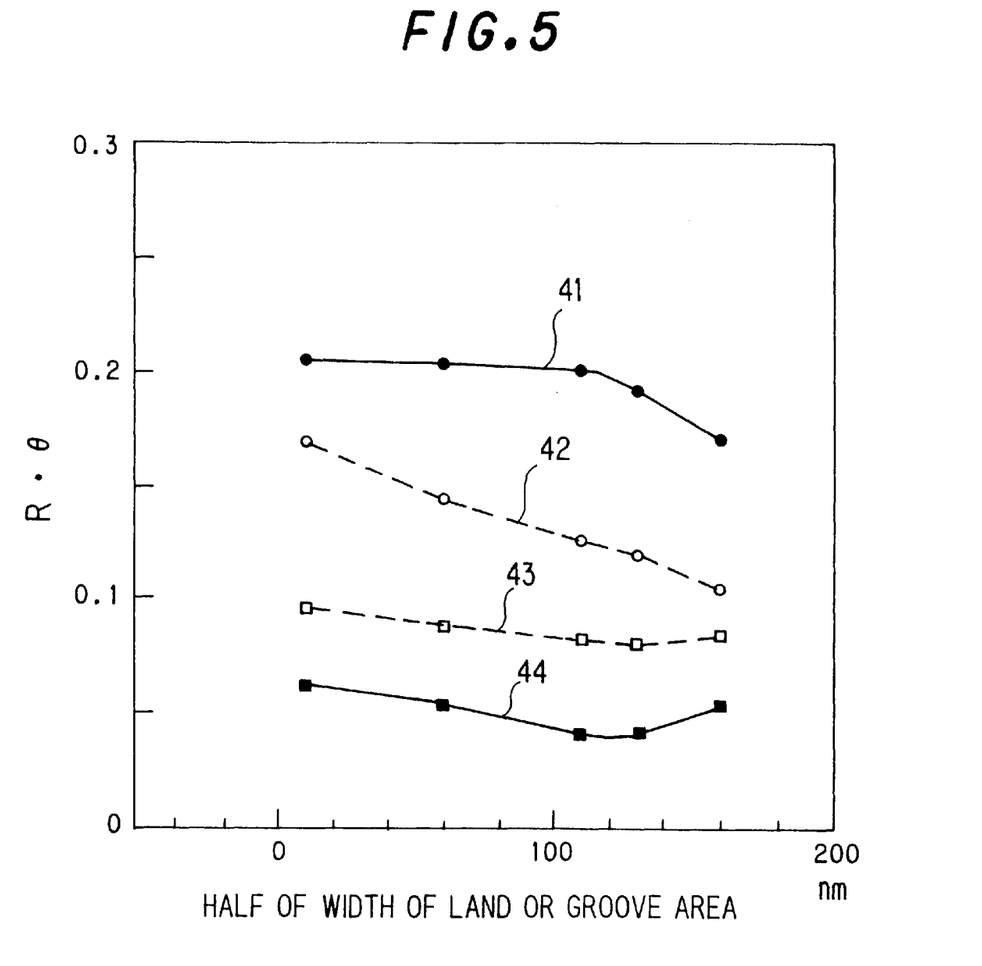
FIG. 5 a graph for explaining another principle of the invention.

FIG. 5 shows relationship of the product (Rθ) and the form of the guide groove portion 16, where the width of the guide groove portion 16 is 340 nm. In FIG. 5, a characteristic curve 41 represents a relationship in the land area 18 when the p polarized beam is projected to the land area 18. A characteristic curve 42 represents a relationship in the groove area 17 when the p polarized beam is projected to the groove area 17. A characteristic curve 43 represents a relationship in the groove area 17 when the s polarized beam is projected to the groove area 17. A characteristic curve 44 represents a relationship in the land area 18 when the s polarized beam is projected to the land area 18.

Referring to FIGS. 4 and 5, it is pointed out that the outputs in the groove area 17 and the land area 18 are increased when the width of the guide groove portion 16 is smaller. However, it is hardly possible to use the magneto-optical medium 30 which comprises the guide groove portion 16 having the width of 340 nm. Therefore, the magneto-optical medium 30 comprises the guide groove portion 16 having the groove area 17 and the land area 18 which have at least one protruding portion.

Figure 6:
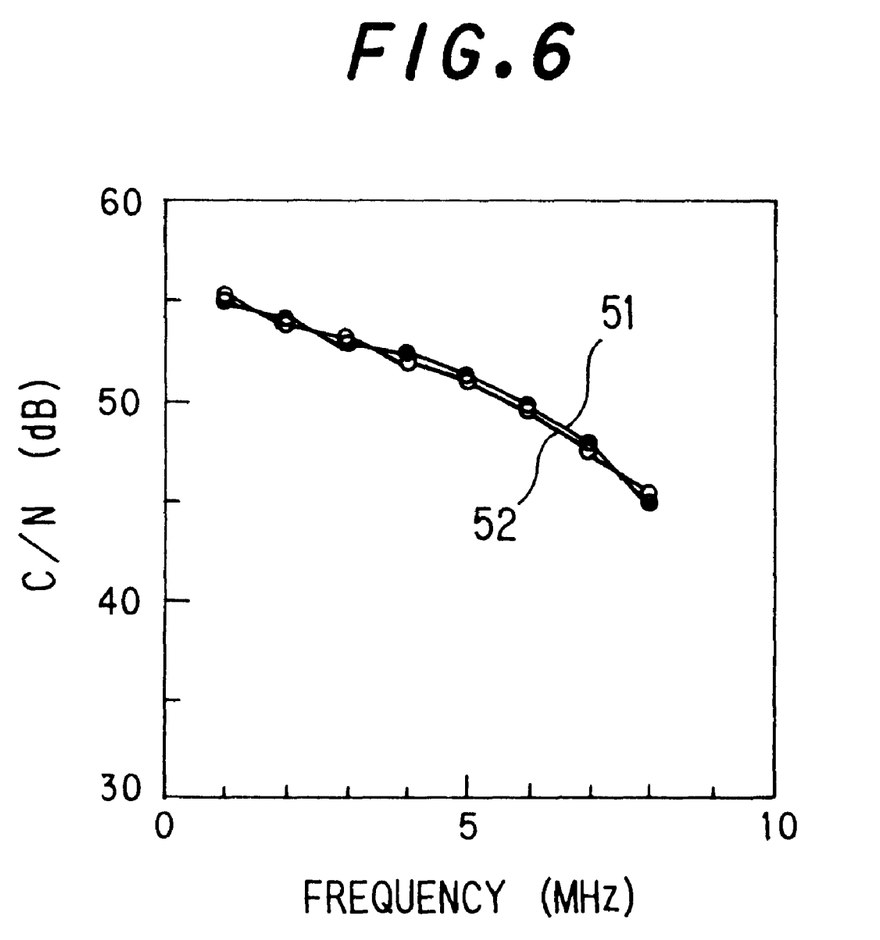
FIG. 6 is a graph for explaining characteristics of the first embodiment of the invention.

By a method of writing and reading data of the guide groove portion 16 shown in FIG. 3, the data are written with a linear velocity of 9.4 m/s in both the groove area 17 and the land area 18 and the data are read from both the groove area 17 and the land area 18. In this event, method uses a the laser beam which has a wavelength of 680 nm. As a result, as shown in FIG. 6, characteristic curves 51 and 52 are obtained.

The characteristic curves 51 and 52 represent relationship of C/N to frequency of the laser beam. The characteristic curve 51 represents relationship of C/N to frequency of the laser beam in the land area 18 when the p polarized beam and the s polarized beam are projected to the land area 18. The characteristic curve 52 represents relationship of C/N to frequency of the laser beam in the groove area 17 when the p polarized beam and the s polarized beam are projected to the groove area 17. As shown in FIG. 6, the C/N in the land area 18 is substantially equal to the C/N in the groove area 17 when the p polarized beam and the s polarized beam are projected to the groove area 17 and the land area 18.

Figure 7:
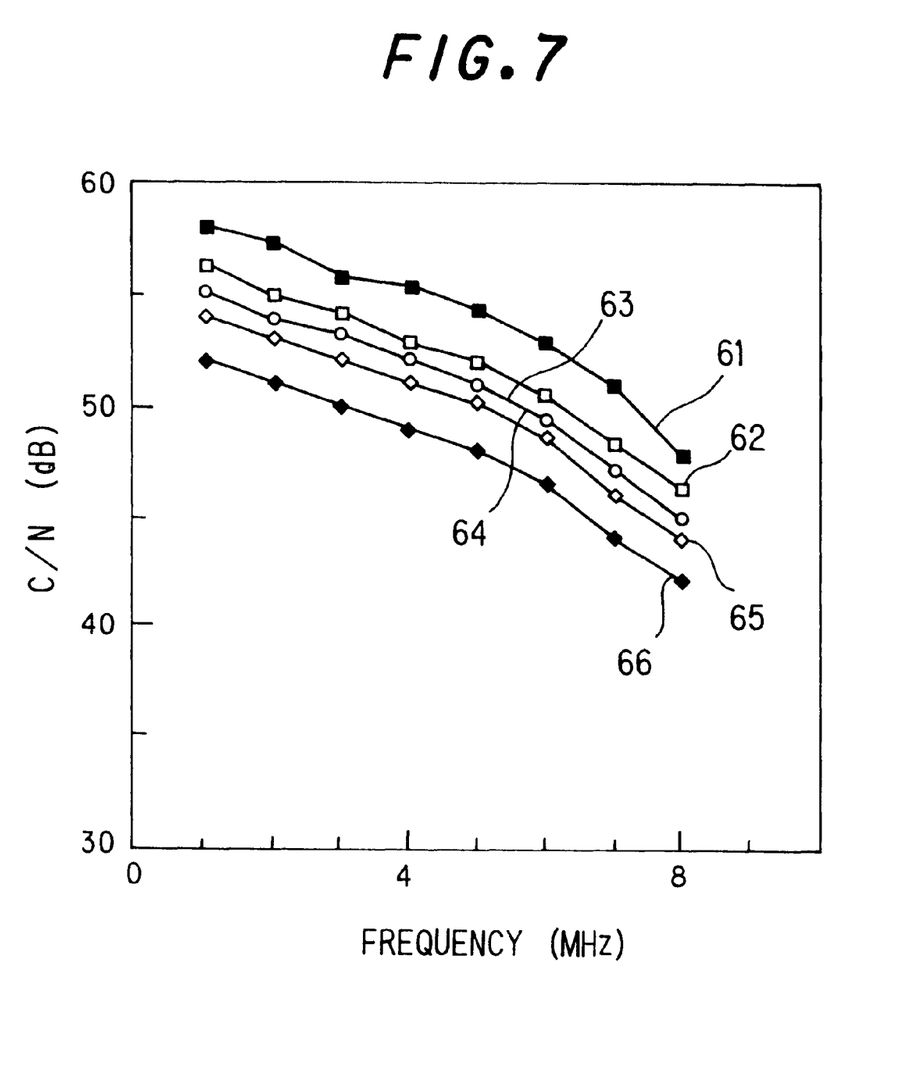
FIG. 7 is a graph for explaining characteristics of a second embodiment of the invention.

Referring to FIG. 7, characteristic curves 61, 62, 63, 64, 65, and 66 are obtained by a method of writing and reading data of a second magneto-optical recording medium which is similar to the magneto-optical recording medium 30 except that the boundary area 19 has an inclination angle of 60 degrees. The characteristic curves 61 to 66 are obtained by a method which is similar to the method of obtaining the characteristic curves 51 to 54 in FIG. 6.

The characteristic curves 61 to 66 represent characteristics of C/N to frequency of the laser beam. The characteristic curve 61 represents relationship of C/N to frequency of the laser beam in the land area 18 when the p polarized beam is projected onto the land area 18. The characteristic curve 62 represents relationship of C/N to frequency of the laser beam in the groove area 17 when the p polarized beam is projected onto the groove area 17. The characteristic curve 63 represents relationship of C/N to frequency of the laser beam in the land area 18 when the polarization direction of the linearly polarized beam of the read laser beam forms the angle of 45 degrees with the guide groove portion 16. The characteristic curve 64 represents characteristic of C/N to frequency of the laser beam in the groove area 17 when the polarization direction of the linearly polarized beam of the read laser beam forms the angle of 45 degrees with the guide groove portion 16. The characteristic curve 65 represents relationship of C/N to frequency of the laser beam in the groove area 17 when the s polarized beam is projected onto the groove area 17. The characteristic curve 66 represents relationship of C/N to frequency of the laser beam in the land area 18 when the s polarized beam is projected onto the land area 18.

Figure 8:
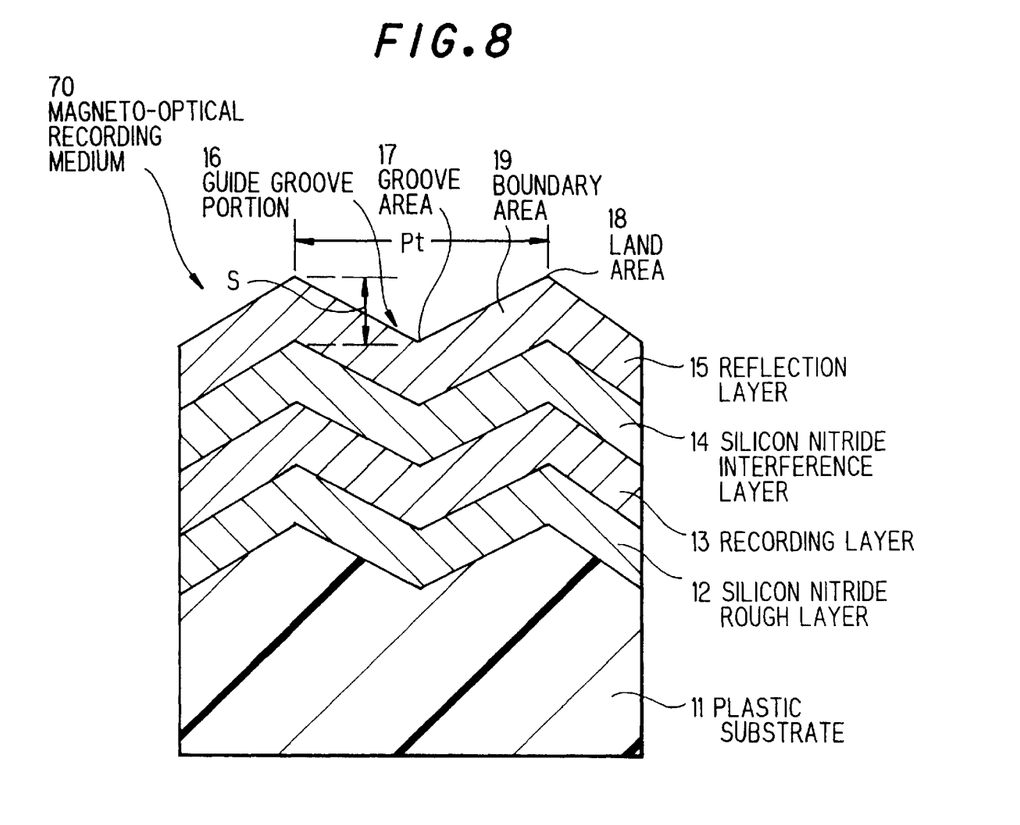
FIG. 8 is a schematic sectional view of a magneto-optical recording medium according to a third embodiment of the invention.

Referring to FIG. 8, the description will be proceed to a third magneto-optical recording medium 70 which is similar to the magneto-optical recording medium 30 except that the guide groove portion 16 has the form of a V.

Characteristic curves (not shown) are obtained by a method of writing and reading data of a second magneto-optical recording medium 70. The characteristic curves are obtained by the method which is similar to the method of obtaining the characteristic curves 61 to 66 in FIG. 7. As a result, it is pointed out that the outputs of the groove area 17 and the land area 18 are greatest when the p polarized beam is projected onto the groove area 17 and the land area 18.

Figure 9:
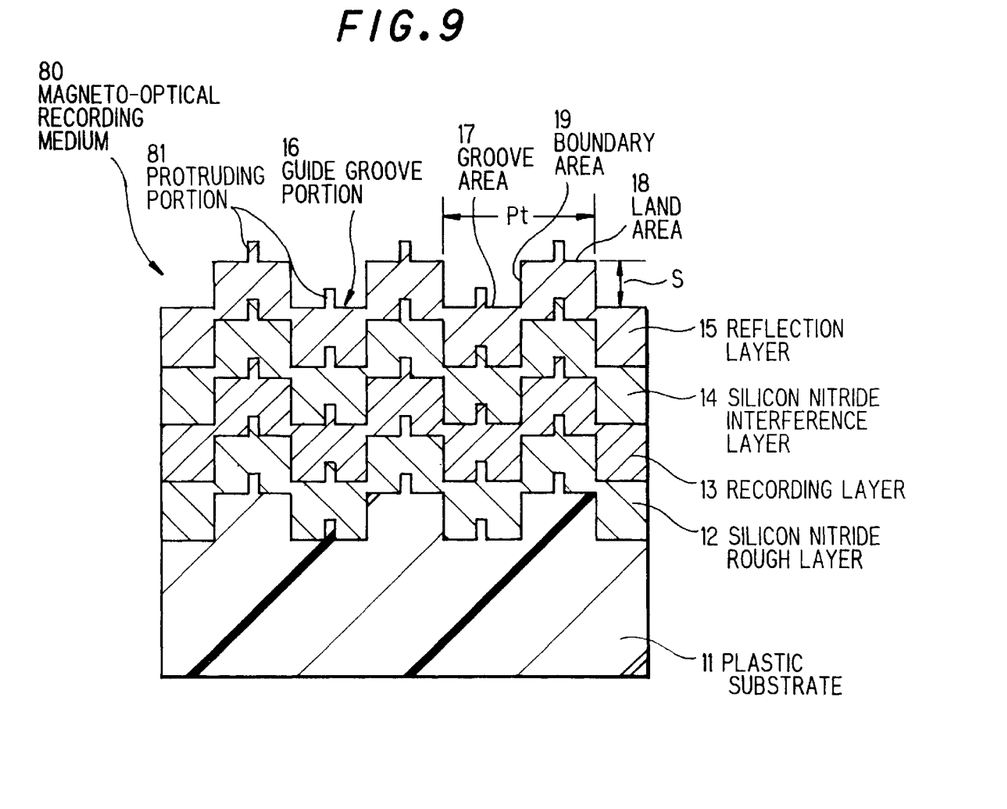
FIG. 9 is a schematic sectional view of a magneto-optical recording medium according to a fourth embodiment of the invention.

Referring to FIG. 9, the description will proceed to a fourth magneto-optical recording medium 80 which is similar to the magneto-optical recording medium 30 except that each of the groove area 17 and the land area 18 has a protruding portion 81. In this case, the protruding portions 81 are formed in parallel to the guide groove portion 16. Each of the protruding portions 81 has a width of 100 nm and a highness of 20 nm.

Characteristic curves (not shown) are obtained by a method of writing and reading data of a second magneto-optical recording medium 80. The characteristic curves are obtained by a method which is similar to the method of obtaining the characteristic curves 61 to 66 in FIG. 7. As a result, it is pointed out that the outputs in the groove area 17 and the land area 18 are greatest when the p polarized beam is projected to the groove area 17 and the land area 18.

While the invention has been described in conjunction with several embodiments thereof, it will now be readily possible for those skilled in the art to put the invention into practice in various other manners. For example, a protecting layer of such as an ultraviolet ray curing resin may be formed on the reflection layer 14. Only the groove area 17 may have the form of a V. The protruding portion 81 may be formed on only the groove area 17. Two magneto-optical media 30, 70, or 80 may be combined so that the plastic substrates 11 are positioned outside.

Although the invention has been described with respect to specific embodiment for complete and clear disclosure, the appended claims are not to be thus limited but are to be construed as embodying all modifications and alternative constructions that may be apperent to one skilled in the art, which fairly fall within the basic teaching herein before set forth.

What is claimed is:

1. A method of reading data of a magneto-optical recording medium which comprises a guide groove portion having a land area, a groove area, and a boundary area between said land area and said groove area, said method comprising the steps of:

using a read laser beam to obtain a polarization direction of a linearly polarized beam at an angle $\alpha$ with said guide groove portion, said angle $\alpha$ being from 40 degrees to 50 degrees both inclusive; and obtaining an output reading of said land area and said groove area wherein both said output readings being substantially equal.

2. A method of reading data of a magneto-optical recording medium which comprises a guide groove portion having a land area, a groove area, and a boundary area between said land area and said groove area, both said land area and said groove area having a cross-section form of V, said method comprising the steps of:

using a read laser beam to obtain a polarization direction of a linearly polarized beam at an angle of 90 degrees with said guide groove portion; and obtaining a C/N value of said land area and said groove area, wherein both said C/N values being substantially equal.

3. A method of reading data of a magneto-optical recording medium which comprises a guide groove portion having a land area, a groove area, and a boundary area between said land area and said groove area, at least one of said land area and said groove area having an outwardly protruding portion which is formed in parallel to said guide groove portion and which has a width which is less than half a wavelength of said read laser beam, said method comprising the steps of:

using a read laser beam to obtain a polarization direction of a linearly polarized beam at an angle of 90 degrees with said guide groove portion; and obtaining a C/N value of said land area and said groove area, wherein both said C/N values being substantially equal.

* * * * *